April 16, 1963 G. T. MOTOCK 3,085,969
COLLECTION DEVICE FOR PRODUCTS OF FUSED
SALT ELECTROLYSIS CELL
Filed Aug. 16, 1960 9 Sheets-Sheet 1

INVENTOR.
GEORGE T. MOTOCK

BY
Adams, Forward & McLean
ATTORNEYS

FIG. 2

INVENTOR.
GEORGE T. MOTOCK

INVENTOR.
GEORGE T. MOTOCK

INVENTOR.
GEORGE T. MOTOCK
BY Adams, Forward & McLean
ATTORNEYS

April 16, 1963

G. T. MOTOCK 3,085,969

COLLECTION DEVICE FOR PRODUCTS OF FUSED
SALT ELECTROLYSIS CELL

Filed Aug. 16, 1960

INVENTOR.
GEORGE T. MOTOCK

BY
Adams, Forward & McLean
ATTORNEYS

April 16, 1963 G. T. MOTOCK 3,085,969
COLLECTION DEVICE FOR PRODUCTS OF FUSED
SALT ELECTROLYSIS CELL
Filed Aug. 16, 1960 9 Sheets-Sheet 8

*INVENTOR.*
GEORGE T. MOTOCK
BY
Adams, Forward & McLean
ATTORNEYS

April 16, 1963 G. T. MOTOCK 3,085,969
COLLECTION DEVICE FOR PRODUCTS OF FUSED
SALT ELECTROLYSIS CELL
Filed Aug. 16, 1960 9 Sheets-Sheet 9

*INVENTOR.*
GEORGE T. MOTOCK

BY

ATTORNEYS

United States Patent Office 3,085,969
Patented Apr. 16, 1963

3,085,969
COLLECTION DEVICE FOR PRODUCTS OF FUSED SALT ELECTROLYSIS CELL
George T. Motock, Hamden, Conn., assignor to Olin Mathieson Chemical Corporation, a corporation of Virginia
Filed Aug. 16, 1960, Ser. No. 50,023
9 Claims. (Cl. 204—247)

This invention relates to improvements in the design of cells used for the production of alkali metals, e.g., sodium and lithium, by electrolysis of a fused salt. In particular, this invention relates to novel structures for collecting the products of electrolysis in such fused salt cells.

In the operation of fused salt cells, a fused salt mixture is electrolyzed to produce alkali metal at the cathode and halogen gas at the anode. The anode is conventionally a cylindrical graphite or carbon anode surrounded by an annular metallic cathode. A porous diaphragm is provided in the anode-cathode annular space to assist in the separation of the products of electrolysis.

In such cells, the structure for the collection of the products of electrolysis is of critical importance, particularly in cells for the production of lithium. Suitable collecting structures are difficult to obtain because of the severe conditions of operation, i.e., the intense heat of the cell, the very corrosive nature of the molten electrolyte (particularly a fused mixture of lithium chloride and potassium chloride used in the production of lithium), the erosive effect of electrolyte entrained in the chlorine gas stream and plugging of the structure due to entrainment of molten electrolyte and resultant freezing in cooler parts of a collecting structure. In present commercial fused salt cells for the production of lithium, for the lack of adequate collecting and separating structures chlorine is not recovered and lithium is removed from the cell surface as a crude product containing chlorides of lithium and potassium as impurities. Thus, the chlorine is wasted and an additional processing step is required to obtain lithium of 99 percent or more purity.

This invention provides novel structures for recovering, directly from the cell, the chlorine and lithium in purity of 99 percent or more.

The collecting equipment of this invention includes a collecting assembly or structure substantially submerged in the molten electrolyte for collecting the chlorine and lithium products liberated at the anode and cathode, a dome for separating the chlorine from the electrolyte in the collecting structure, a riser for collecting lithium metal from the electrolyte in the collecting structure, a holding tank for the lithium metal collected and a structure for supporting and positioning the collecting assembly.

The structure of the invention for collecting chlorine and lithium liberated at the anode and cathode comprises a hood positioned over and larger than the anode and cathode, a cylinder downwardly projecting from the hood and having attached thereto a porous cylindrical diaphragm annularly spaced between the anode and cathode, the cylinder opening into the hood, a substantially cone-shaped portion on top of the hood and positioned over the cylinder opening and providing an upwardly sloping surface from the cylinder opening to an opening in the top of the substantially cone-shaped portion. The structure is at least substantially submerged in the electrolyte and the chlorine liberated at the anode flows upward in the space between the anode and diaphragm and through the cylinder, into the hood and into the cone and out the cone opening. The upper surface of the hood is formed by an inclined surface forming an inverted inclined trough encircling the cylinder with an opening in the highest part of the hood surface whereby lithium metal liberated at the cathode flows into the inverted inclined trough and out the trough opening. The hood can be substantially rectangular in shape but preferably is substantially cylindrical. The collecting structure effectively separates chlorine and lithium in the electrolyte and guides them to structures for their recovery, and prevents their re-combination which would result in contaminated lithium and effectively prevents entrainment of electrolyte in the chlorine stream.

The dome of the invention for separating chlorine gas from the electrolyte in the collecting structure comprises a vertical cyindrical refractory-lined shell positioned over the opening for chlorine gas evolution from the submerged collecting structure positioned over the anode and cathode. The cylindrical refractory-lined shell has an open bottom and a flat solid top with an opening in the center for escape of halogen gas. The top opening is of substantially smaller diameter than the cylindrical shell. The cylindrical shell provides a lower, more uniform gas velocity than a cone-shaped dome, and substantially eliminates entrainment of electrolyte from the cell and thereby any plugging in the chlorine exit lines from frozen electrolyte. With a cone-shaped dome, entrainment occurs rapidly with accompanying rapid plugging of chlorine exit lines. When this occurs, chlorine by-passes the dome and exits on the cell melt surface necessitating a shut-down. Also, unprotected metal surfaces are rapidly corroded and eroded. The cylindrical refractory-lined dome of the invention effectively separates the chlorine gas without entrainment of melt to provide chlorine gas of purity of 99 percent or more, and has a long operating life even under the very severe conditions.

The riser of the invention for collecting lithium metal produced comprises a vertical cylinder with a closed top and containing in its lowest portion, and adapted to fit over the opening for lithium metal escape from the submerged collecting structure positioned over the cathode area, a smaller cylinder. The smaller cylinder inside the larger cylinder has a portion of its wall joined to the interior wall of the larger cylinder so as to form a semi-annular space between the smaller and larger cylinders. A conduit is provided extending through the wall of the larger cylinder and upwardly inclined with its lower edge resting on and projecting over the smaller cylinder top. A second conduit is provided downwardly inclined and attached to the first conduit at its highest point so that the two conduits form an inverted V-shaped structure. Preferably, an opening is provided at the point of joining of the conduits and removable means for closing the opening. The lithium metal rises up into the smaller interior cylinder and over its edge into the semi-annular space and then up through the upwardly inclined conduit and then down through the downwardly inclined conduit. This structure effectively prevents chlorine gas and electrolyte from being carried through the riser by the molten lithium and effects a complete separation of the lithium metal of high purity. Recombination of lithium and chlorine is virtually eliminated. Also, inert gas padding to the metal (to prevent reaction between molten lithium and air) can be substantially reduced. Since carryover of electrolyte is substantially eliminated, problems of plugging of the riser and connecting lines with frozen electrolyte are substantially eliminated. In conventional cylindrical risers, even with baffles, effective separation of lithium from chlorine and electrolyte cannot be obtained and re-combination and plugging occurs.

The tank of the invention for holding lithium metal comprises a heated closed cylindrical tank with an inclined bottom, means in the top of the tank for introducing liquid alkali metal, valve means at the lowest portion of the bottom of the tank for discharging liquid alkali metal, said valve means having a heated seat and means for operating said valve from the top of the tank. The tank effectively maintains the lithium in the molten state until drained off. The heated valve seat effectively prevents freezing of molten lithium in this area of the valve.

The structure of the invention for supporting and aligning the structure for collecting products of electrolysis comprises two vertical electrically insulated posts positioned outside the cell wall. Each post comprises an electrically insulated pilot shaft, a bottom casing surrounding the pilot shaft, screw means in the bottom casing for engaging the pilot shaft to hold and position it laterally, an electrically insulated collar plate resting on the top of the bottom casing, an adjusting collar positioned above the plate, a sleeve surrounding the pilot shaft and resting on the adjusting collar, vertical screw means in the adjusting collar engaging the plate to position the sleeve vertically and a top casing resting on the sleeve and means attached to and joining the top casing of each post from which the structure for collecting products of electrolysis is suspended. This structure provides effective alignment of the collecting assembly, particularly the diaphragm, and the chlorine dome. At the temperature of operation, the metal and non-metal parts expand at different rates and tend to lose the original alignment as heated to operating temperature. The structure of the invention allows the diaphragm, in particular, to be centered properly during cell operation.

The invention will be further illustrated by reference to the accompanying drawings which illustrate a fused salt electrolysis cell with four anodes and cathodes and designed for operation at 30,000 amperes and for the production of lithium from a mixture of lithium chloride and potassium chloride.

Figure 1:
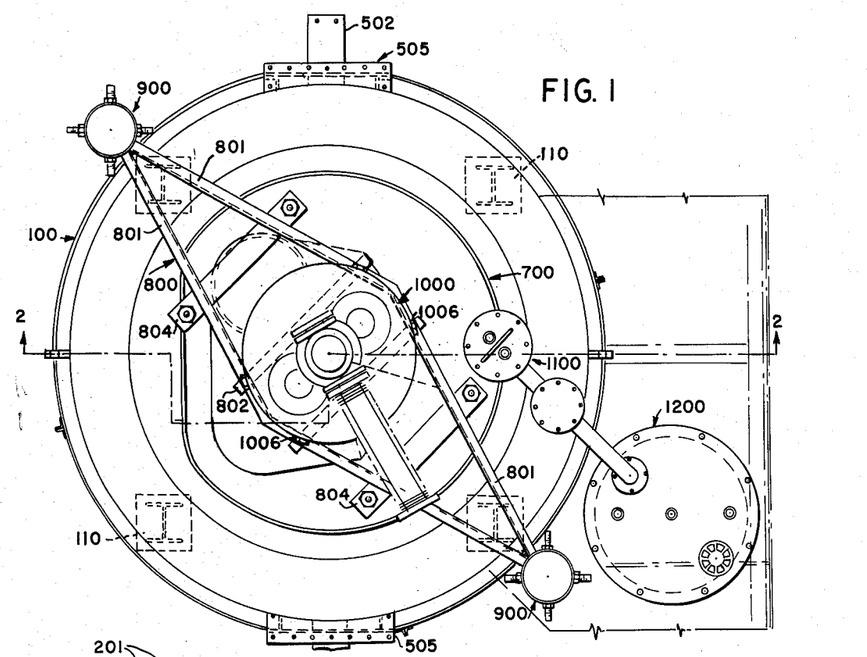
FIGURE 1 is a plan view of the fused salt electrolysis cell with the cover removed.
Figure 2:
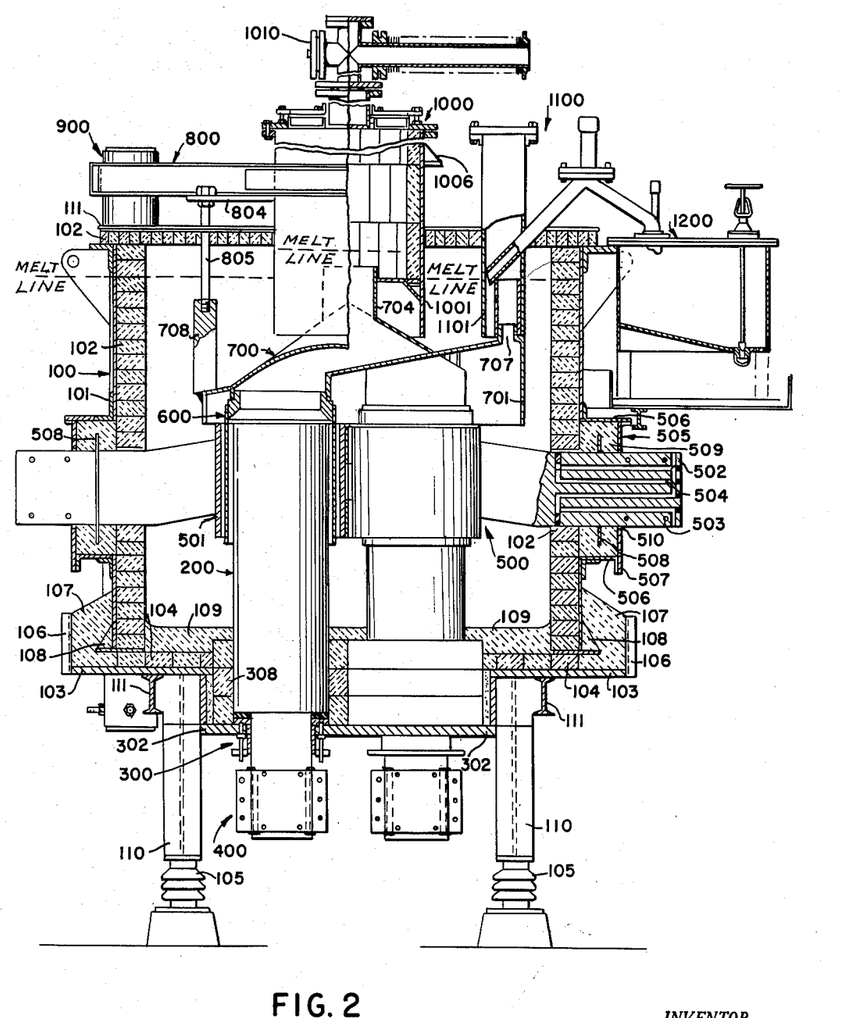
FIGURE 2 is a view of the section taken along 2—2 of FIGURE 1.

In the drawings and as shown generally in FIGURES 1 and 2, the basic cell structure 100 is formed from metal and refractory material and the cell contains four bottom entrant cylindrical anodes 200, for which anodes sealing means 300 are provided, as well as anode connectors 400 for supply of electrical energy. The anodes are surrounded by an assembly of four cathodes 500 with opposed side arms. A porous diaphragm 600 is positioned between each cathode and anode. A collecting assembly 700 for collecting chlorine and lithium metal products is positioned above the cathode-anode area and is supported by a collector assembly support 800 and positioned and aligned by pilot posts 900. Chlorine is recovered by means of dome 1000 and lithium metal by means of riser 1100 and holding tank 1200.

The cell 100, as shown particularly in FIGURES 1 and 2, is formed from an outer cylindrical shell of steel 101 lined with refractory material 102, e.g., extruded acid proof brick or power pressed brick. The bottom of the cell is formed from a circular steel table 103 lined with refractory material, e.g., brick 104, insulated from the ground by four porcelain insulators 105. The table 103 extends beyond the outer shell 101 and a metal dam 106 is placed on the outside rim of the cell bottom. This is filled and rammed with castable refractory material 107 sloping upwards to the cell shell to a height above the bottom of the cell. This forms a seal with the flange 108 on the bottom of the cell to prevent molten electrolyte leakage. Also, high density monolithic castable refractory cement material 109 is used over the refractory brick to form the bottom lining or floor of the cell. Vertical steel supports 110 and horizontal beams 111 are provided to support the cell bottom. The top of the cell is formed from steel plate 111 lined with refractory material, e.g., brick 102.

Figures 3, 4:
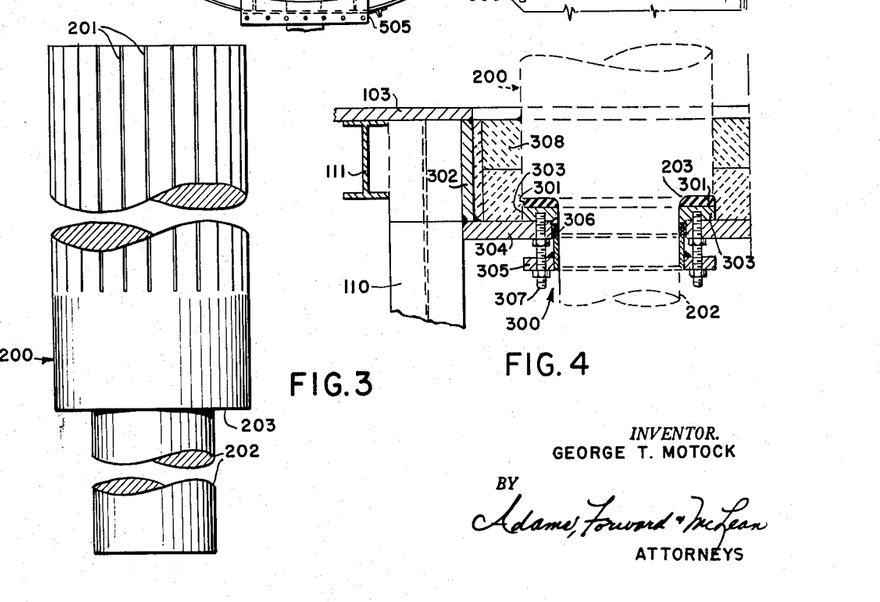
FIGURE 3 is a side view of one of the anodes of FIGURE 1.
FIGURE 4 is a cross-sectional view of the anode sealing means of FIGURE 1.
Figure 5:
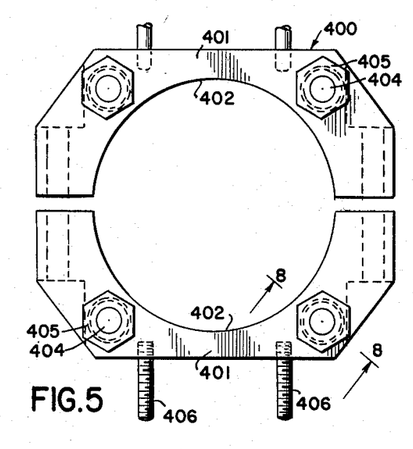
FIGURE 5 is a plan view of the anode connector of FIGURE 1.
Figure 6:
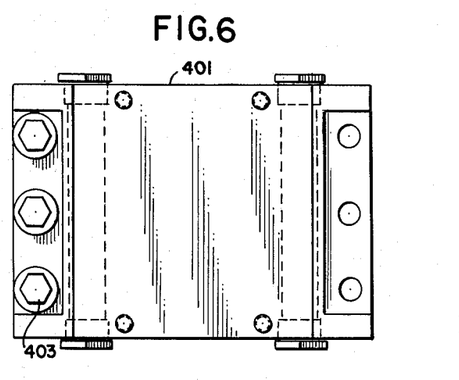
FIGURE 6 is a front view of the anode connector of FIGURE 1.
Figure 7:
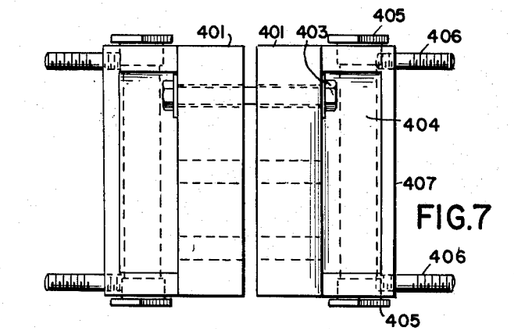
FIGURE 7 is an end view of the anode connector of FIGURE 1.
Figure 8:
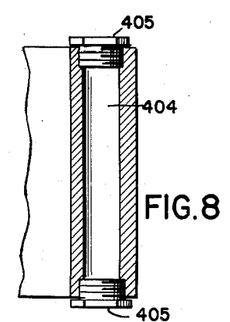
FIGURE 8 is a cross-sectional view taken through 8—8 of FIGURE 5 showing a typical water-cooled area.
Figure 9:
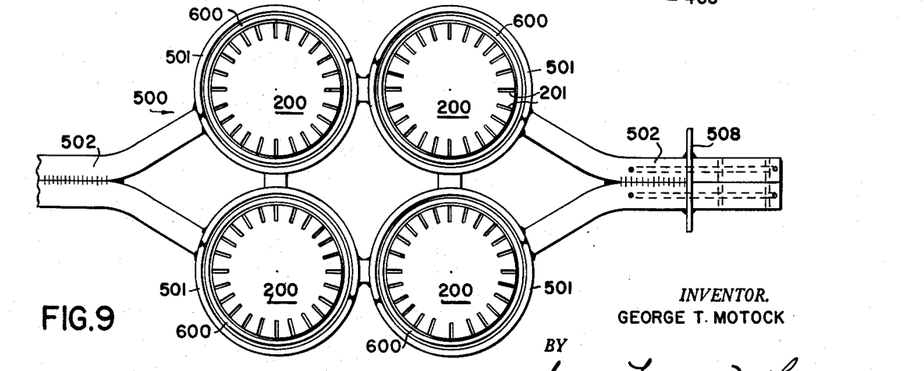
FIGURE 9 is a plan view of the cathode assembly of FIGURE 1, showing the anodes and diaphragms in place.
Figure 10:
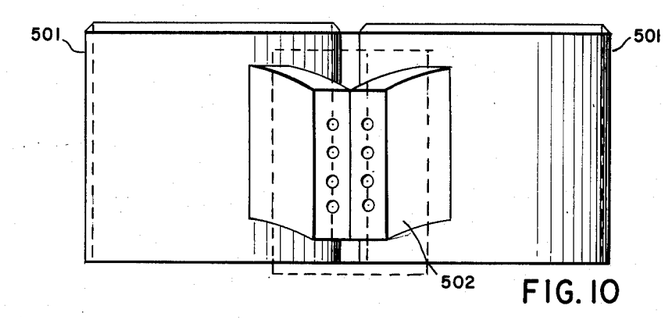
FIGURE 10 is a front elevation view of the cathode assembly of FIGURE 9.
Figure 11:
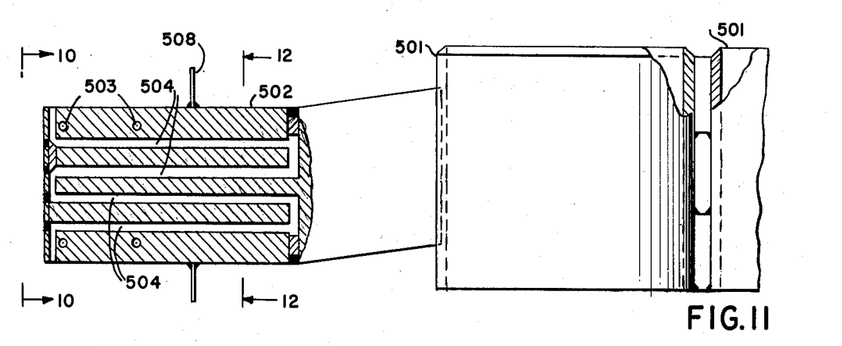
FIGURE 11 is a side elevation view of the cathode assembly of FIGURE 9.
Figure 12:
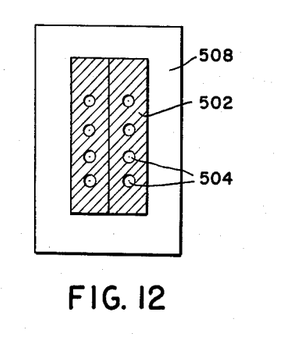
FIGURE 12 is a detail of the dam of FIGURE 9.

The anodes 200 are cylindrical, solid, graphite anodes and contain, as shown particularly in FIGURE 3, spaced slots 201 in the area adjacent the cathode. As shown in FIGURE 9, the slots do not extend through to the center of the anode. Preferably, the slots extend to only about one-third of the diameter of the anode. The anodes of this particular cell are sixteen inches in diameter with twenty-four slots, each slot being one-eighth inch wide and two inches deep. Also, an anode with twelve slots, each slot being one-quarter inch wide and two inches deep can be used. The twelve slot anode is faster and easier to machine. Each anode is machined from dense graphite with an overall length of sixty-eight inches. The slots extend twenty-three inches downward from the top of the anode. The slotted, solid anode provides decreased resistance to chlorine flow in the anode compartment of the cell, increased ion distribution in the cathode-anode annular space and low voltage drop across anode to cathode.

The anode is provided with a portion of reduced diameter 202 at the lower end thereof forming a shoulder 203 to facilitate supporting and sealing the anode, electrically and mechanically. In the particular cell illustrated, the lower twenty inches of the anode is reduced to a ten inch diameter.

The supporting and sealing means 300 for the anodes, as shown particularly in FIGURE 4, comprises the shoulder 203 of the anode 200 which rests on an insulating ring 301 inside a squared metal, e.g., steel, enclosure, e.g., a box or pan-like section 302 attached to the cell bottom 103. The ring 301 serves to insulate electrically the pan from the anode. The box is concentrically located beneath a circular steel cell bottom. The box is divided into four quadrants each containing an opening for the anode. The portion of the anode of reduced diameter 202 passes through the opening in the box section 302 and the opening is sealed by means of a metal sealing ring 303 between the insulating ring 301 and the pan bottom 304 and a packing gland 305. The gland 305 is adapted to hold packing 306 tightly against the anode and sealing ring 303 by means of bolts 307 engaging the gland, cell bottom and sealing ring. The anode is sealed in the cell bottom and box by means of refractory material 308, e.g., refractory brick. In the cell illustrated, the insulating ring 301 serving as electrical insulation between the anode and steel shell is a three-quarter inch thick transite ring with an outside diameter equal to that of the upper anode portion and an inside diameter slightly larger than the lower anode portion. Special quadrant refractory 308 brick, four inches thick, are laid as fill for the anode box to seal the anode in the box. They are laid three high with refractory cement as a filler. The cell floor 109 of castable refractory material is laid to a depth of two inches over the quadrant brick. After drying, the cell and packing gland are tightened to complete the anode seal. The sealing means effectively prevents escape of molten electrolyte around the anode and at the same time provides for easy removal and replacement of the anode without destruction of the cell floor.

Electrical energy is supplied to the anodes by means of anode connectors or clamps 400, as shown particularly in FIGURES 5 to 8. The clamp comprises two opposed metal sections 401 each having a semi-cylindrical interior surface 402 for fitting around the external portion of the cylindrical anode, bolts 403 for holding the sections 401 together and the interior surfaces tightly against the anode surface, passages 404 with pipe connectors (bushings) 405 within each section for the flow of coolant through the sections and studs 406 for connection to buses. The cooling of the clamp cools the lower portion of the anode and also freezes any molten electrolyte that may leak around the anode seal. Also, the coolant aids in reducing expansion of the metal parts preventing loosening of the connection. A copper bus is attached to each half of the clamp by means of the four studs 406 and a four sided frame which bolts the bus tightly to the clamp. The clamp is preferably made from silicon bronze rather than mild steel because of the compatibility of silicon bronze and copper bus connections and also because of its high resistance to corrosion as well as high strength. The sections 401 can be machined from solid stock or cast and partially machined. The portions of the clamp facing the graphite anode (surfaces 402) and copper bus (surface 407) are plated with silver to insure good electrical contact. In the particular clamp illustrated, the clamp, when tightened, forms a ten inch diameter by ten inch high sleeve and faces 1130.4 inches of graphite, giving a current density of 26.54 amperes per square inch at 30,000 amperes.

The cathode assembly 500 includes cylindrical steel cathode sleeves or rings 501 concentrically surrounding each anode and having opposed steel side arms 502. As shown particularly in FIGURES 1 and 2 and 9 to 12, the side arms 502 of the illustrated cell support the group of four cathode cylinders 501. The walls of the cathode cylinders are solid. In the particular cell illustrated, the inner diameter of the cathode ring is nineteen inches. The anode-cathode spacing is one and one-half inches. The side arms 502 rest on the refractory brick lining of the cell wall and extend through the outer shell of the cell and are machined and silvered to accommodate a copper bus which is clamped to the arm in a manner similar to the anode by means of studs 503. The side arms are provided with passages 504 for flow of coolant. The side arms are insulated and sealed against electrolyte leakage by means of a metal, e.g., steel, enclosure or box 505 mounted on the side of the cell shell through which box the side arms pass (see FIGURES 1 and 2). The box comprises four walls 506 attached to the cell shell 101 and a side plate 507 bolted to the walls 506. A metal dam or dike 508 is welded to the side arm 502 so that the dam 508 is approximately centrally located with the box 505. After the brick shell is built around the cathode arms, castable refractory cement 509 is rammed and packed into the box so that it is in tight contact with the cell and box walls and side arms and the dam thereon. The castable refractory material and dam effectively prevent the molten electrolyte from leaking through the cathode seal. The dam also can be in the shape of a U. Also, an additional dam can be attached to the inside of the box to provide a more tortuous path for the electrolyte and prevent its leakage. Also, the coolant in the cathode side arm serves to freeze any molten electrolyte leaking into the box and thus aids the seal. The side plate 507 has an opening 510 through which the cathode arm passes without contacting the plate. The opening is designed to leave a gap around the cathode side arm to insure against electrical contact between the arm and the metal shell of the cell. Thus, the cathode side arm is in contact only with refractory material which serves as insulation.

Figure 14:
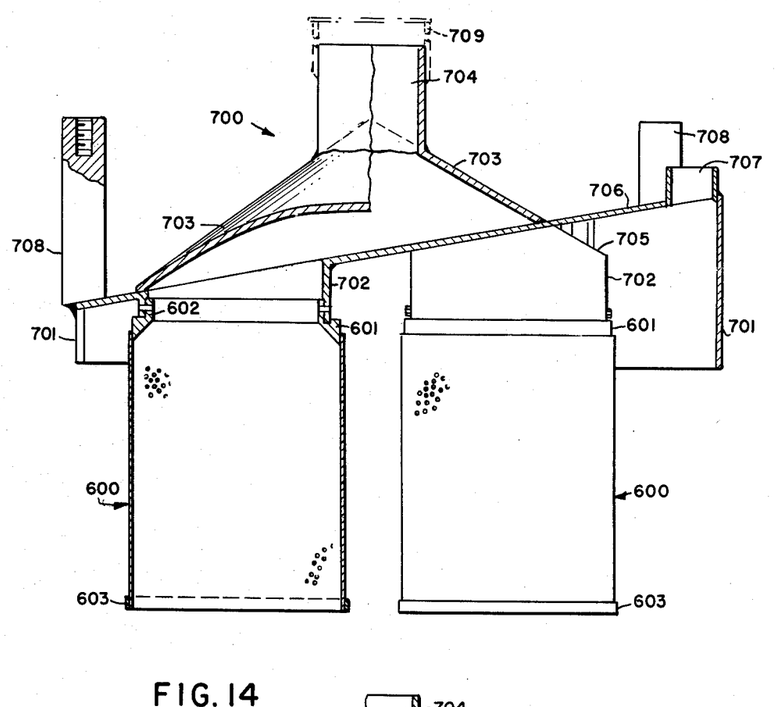
FIGURE 14 is a sectional view taken through 14—14 of FIGURE 13.

The diaphragms 600 are cylindrical sleeves positioned in the area between each anode 200 and cathode sleeve 501. The preferred diaphragm, as shown in detail in FIGURE 14, is a perforated metal sheet, although other types made from porous ceramic materials, e.g., alumina, magnesia or other oxides non-reactive with the electrolysis products, or metal wire screens can be used. The metal sheet can be carbon steel or stainless steel of at least twenty-four gauge thickness. The important feature of the diaphragm is the percentage of open area. The open area required varies with the electrolysis conditions, i.e., the composition, temperature and viscosity of the molten salt mixture (electrolyte) employed. An open area of about 30 to 50 percent has been found to be satisfactory for the illustrated cell. In the particular cell illustrated, the preferred diaphragm is a cylinder of twenty-four gauge perforated stainless steel (type 304 or 316) sheet of an inner diameter of seventeen inches and an overall length of twenty four and one-quarter inches. The perforations are 0.038 inch in diameter, 0.05 on centers both ways giving 400 openings per square inch or 45.4 percent open area straight-line pattern. In another example, the openings are 0.038" diameter, 0.05" x 0.057" center with 351 openings per square inch or 39 percent open area. The dimensions of a 26 gauge, 306 grade stainless steel used are 0.30 inch diameter openings, about 225 holes per square inch or 36 percent open area. The actual shape of the openings is not important. A 0.020 inch thick sheet with slits 0.016 inch wide by 0.140 inch long can be used as a diaphragm. The stainless steel diaphragm is better than one made of carbon steel because carbon steel requires a thicker gauge for strength and rigidity similar to that of stainless steel. A wire diaphragm of carbon steel is unsatisfactory due to buckling in operation. The diaphragm is suspended from the chlorine and metal collecting assembly 700 by means of machined metal adapter ring 601 fitting inside the upper end of the diaphragm and welded thereto. The ring 601 has a portion of reduced diameter 602 projecting above the diaphragm and is bolted to the collecting assembly. This structure is very advantageous in that it reduces the size of the collecting assembly and thus the overall size of the cell. Also, a strengthening ring of metal 603 is attached to the bottom of the diaphragm.

Figure 13:
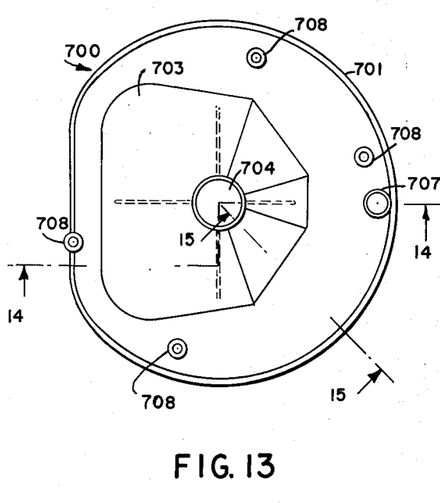
FIGURE 13 is a plan view of the assembly of FIGURE 1 for collecting the products of electrolysis.
Figure 15:
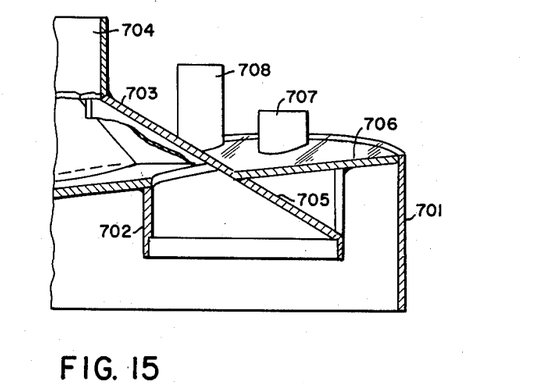
FIGURE 15 is a sectional view taken through 15—15 of FIGURE 13.

The collecting assembly 700 comprises essentially a hood with an inclined upper surface and having within the skirts of the hood cylinders for holding a diaphragm between an anode and cathode and for guiding anode products to a cone-shaped structure on the inclined surface having an opening in its top for gas discharge, while cathode products are guided by the hood skirt enclosure to a discharge opening in the highest part of the inclined surface. As shown in detail in FIGURES 13 to 15, the preferred collecting assembly comprises a single steel unit of a large centrally located cylinder 701 (which can be squared on one section as shown) designed to collect the chlorine evolved at the anode side of the diaphragm 600 and the liquid metal formed at the cathode side of the diaphragm. Four smaller cylinders 702 extend downward from the large central cylinder 701 and hold the diaphragms 600, by means of adapter ring 601, so that passages for chlorine from all the anodes are provided. The diameter of the cylinders 702 can be slightly larger than the anode but smaller than the cathode or can be smaller than the anode, particularly when an adapter ring with a portion of reduced diameter of the type illustrated by 601 is utilized. The chlorine evolved on the anode side of the diaphragm passes up through the smaller cylinders 702 and into a cone-shaped structure 703 on top of the large cylinder which provides an upwardly sloping smooth surface to a small cylinder or pipe 704, preferably of stainless steel, forming an opening conduit through which the chlorine passes to the chlorine dome 1000. Advantageously, a metal screen or baffle 709 can be placed over the chlorine outlet 704 and a calming effect is obtained which reduces salt entrainment. The cone-shaped structure on one side advantageously extends down into the smaller cylinders 702 as shown as 705 to form an upwardly sloping smooth surface for chlorine flow and to eliminate gas pockets. The upper surface of the large cylinder 701 has an inclined surface, preferably about 10° from horizontal, so as to form an inverted inclined trough 706 encircling the small cylinders 702 and the anode-cathode area and lithium metal formed at the cathode side of the diaphragm flows up from the cathode to the trough and out through lithium metal outlet 707. As shown in FIGURE 2, the collecting structure 700 is preferably completely submerged in the molten electrolyte or melt, with the outlet pipe 704 positioned just below the melt line. The melt line in the chlorine dome 1000 is higher than in the cell proper because the pressure in the dome is less than that in the cell proper. The pipe 704 is kept below the melt line to minimize corrosion and erosion from the hot chlorine gas. By the use of suitable materials, however, the pipe can project above the melt line. The collecting structure effectively separates chlorine and lithium in the electrolyte and guides them to structures for their recovery. The collecting structure prevents their recombination which would result in contaminated lithium and effectively prevents entrainment of electrolyte in the chlorine stream. The assembly is provided with posts 708, preferably of stainless steel, threaded to receive hangers for suspension from the collecting assembly support 800. While the preferred hood structure is substantially cylindrical, a substantially rectangular or square hood, preferably rounded on the corners to correspond to the smaller downwardly projecting cylinders, can be used.

The collector support 800, as shown particularly in FIGURE 1, comprises a diamond shaped steel structure, positioned on top of the cell, with arms 801 and cross pieces 802 and 804. The collector assembly is suspended from the support by means of the cross pieces 804 attached to the arms 801 with bolted hanger rods 805 which thread into the collector posts 708. Each end of the diamond shaped structure formed by arms 801 is supported by attachment to a pilot post 900.

Figure 16:
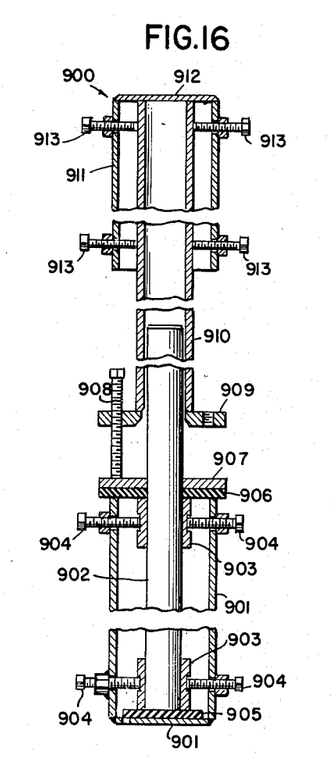
FIGURE 16 is a cross-sectional view of a pilot post of FIGURE 1.

The steel pilot posts 900 are attached to steel frame work 111 and 110 (which also supports the cell proper) and serve through the collector support 800 to position and align the collector assembly 700, including diaphragms 600, and chlorine dome 1000. The post 900, as shown particularly in FIGURE 16, comprises a bottom casing 901 containing a pilot shaft 902 with pilot shaft guide sleeves 903 for receiving set screws 904 for holding and positioning horizontally the pilot shaft 902. The pilot shaft 902 is insulated from the bottom casing by transite ring 905 and is provided with an insulating transite cover 906 on which rests plate 907 which receives adjusting screw 908 in adjusting collar 909 of the pilot guide sleeve 910 on which rests top casing 911 and cover plate 912. Also, set screws 913 are provided to holding guide sleeve 910. The vertical alignment of the collector assembly, diaphragms, and dome can thus be adjusted by screw 908 and also horizontally by means of screws 904, thus providing proper alignment during cell operation.

Figure 17:
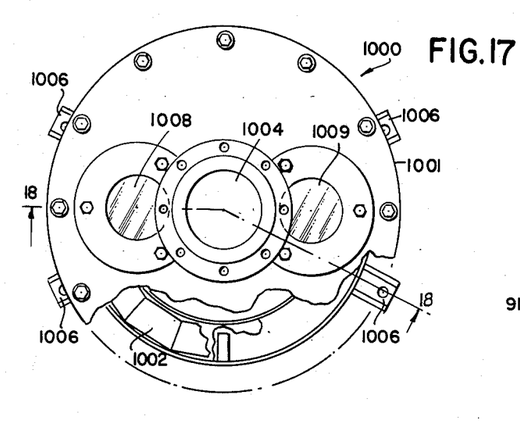
FIGURE 17 is a plan view of the chlorine dome of FIGURE 1.
Figure 18:
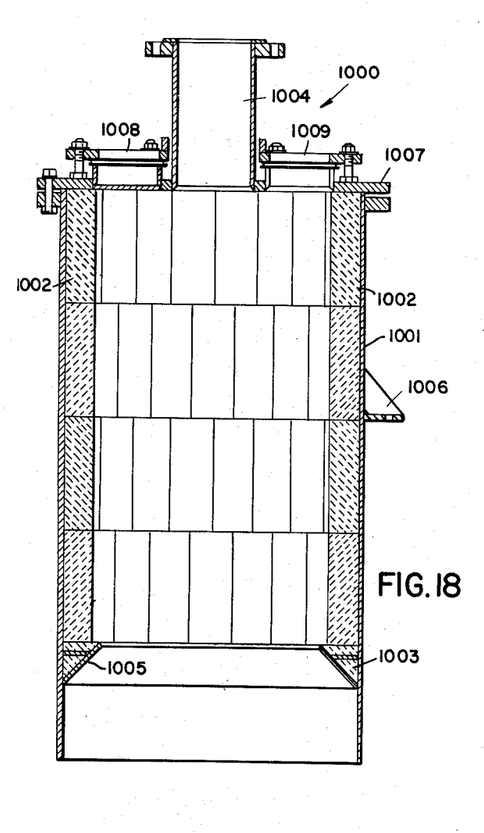
FIGURE 18 is a cross-sectional view taken through 18—18 of FIGURE 17.
Figure 19:
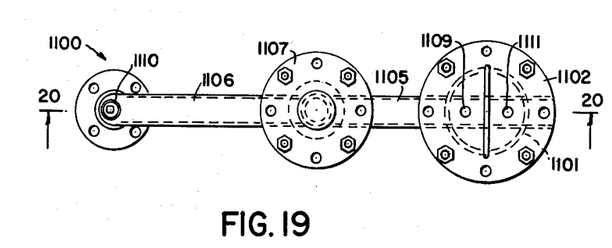
FIGURE 19 is a plan view of the lithium metal riser and overflow pipe assembly of FIGURE 1.
Figures 20, 21, 22:
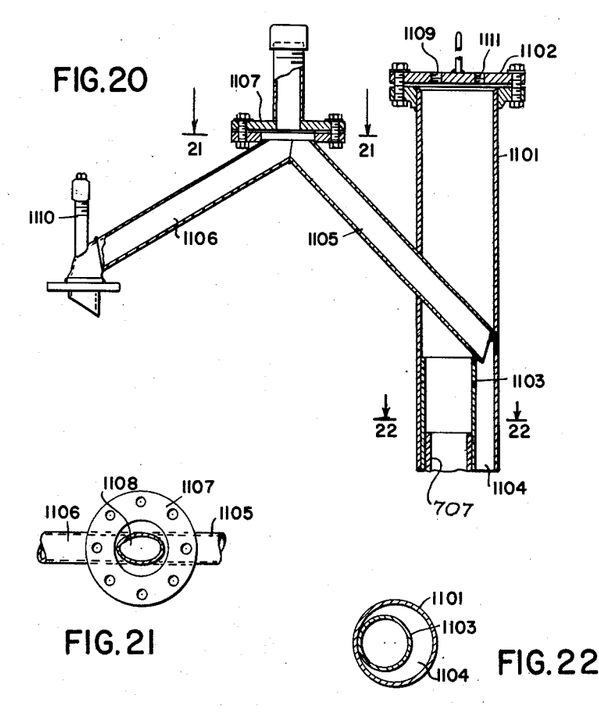
FIGURE 20 is a cross-sectional view taken through 20—20 of FIGURE 19.
FIGURE 21 is a cross-sectional view taken through 21—21 of FIGURE 20.
FIGURE 22 is a cross-sectional view taken through 22—22 of FIGURE 20.

Chlorine dome or riser 1000, as shown in detail in FIGURES 17 and 18, for recovering chlorine after it is separated from the electrolyte comprises a cylindrical (e.g., about two feet diameter) shell 1001, preferably of stainless steel, lined with refractory brick 1002 and castable refractory 1003. At the top of the dome is a centrally located pipe 1004 (e.g., about eight inch diameter) providing an opening for escape of chlorine gas. A metal cone 1005 is provided for supporting the refractory brick and castable refractory. The refractory lining provides effective protection against the corrosive hot chlorine gas and any entrained melt. Flanges 1006 are provided for engagement with cross pieces 802 of the collector support structure 800. The pipe 1004 is in a steel cover plate 1007 which also contains an opening 1008 sealed by gaskets for pressure relief and an opening 1009 sealed by a glass plate for visual observation of operation. Preferably, the dome is insulated on its exterior to prevent plugging from freezing of any molten electrolyte. The dome 1000 is supported from (and positioned by) the collector assembly support 800 by means of cross pieces 802 engaging the flanges 1006 (see FIGURES 1 and 2). As shown in FIGURE 2, the dome 1000 is slightly raised (e.g., one and one-half inches) above the collector 700 so that it does not rest on it in order to provide for circulation of electrolyte. As shown, the dome is positioned over the pipe 704 of the collector 700 and has its lower portion submerged in the melt. The pipe 704 of the collector projects up into the shell 1001, but as discussed above, the pipe 704 should not project above the melt surface to avoid corrosion and erosion. Chlorine is passed from the dome opening 1004 into a recovery system by means of piping 1010. The cylindrical refractory-lined dome effectively separates the chlorine in high purity of 99 percent or more with substantially no entrainment of electrolyte and has a long operating life even under the very severe conditions. It provides a low, uniform gas velocity which substantially eliminates entrainment.

The lithium metal riser 1100, as shown in detail in FIGURES 19 to 22, functions to move the lithium metal which is collected in the annular spacing (inverted inclined trough) under the collector 700, by virtue of the difference in specific gravity between the liquid lithium and the molten eutectic salt mixture, to the hold tank 1200. The riser comprises a cylinder 1101, preferably of stainless steel, with a top plate 1102 and containing in its lower portion and adapted to fit snugly over the pipe opening 707 for lithium metal flow from the collector 700, a smaller interior cylinder 1103, preferably of stainless steel, located off-center and adjacent to one portion of the cylinder 1101 so as to provide a semi-annular space 1104 so that lithium metal flows up through the cylinder 1103 and into the space 1104. The smaller interior cylinder 1103 extends up into the cylinder 1101 a distance sufficient to bring its top at least to the melt line and preferably at the melt line. The riser is supported by the pipes 1105 and 1106 attached to hold tank 1200 and cylinder 1101 (see FIGURE 2). Hold tank 1200 can be positioned vertically or horizontally to align the cylinders 1101 and 1103 over the collector opening 707 and with respect to the melt level.

The lithium metal flows from the space 1104 and cylinder 1101 up through an inverted V-shaped pipe structure, preferably of stainless steel, comprising an upwardly inclined (e.g., 45°) pipe 1105 extending into the cylinder 1101 and over the edge of interior cylinder 1103. The metal flows up the pipe 1105 and then down a downwardly inclined (e.g., 60° from vertical) pipe 1106 into a holding tank 1200. At the top of the inverted V intersection of the two pipes 1105 and 1106 a blind flange 1107 is provided, which can be removed to unplug the pipes 1105 and 1106 through opening 1108, in the event they become plugged with frozen electrolyte or metal. Maintaining pipe 1105 and 1106 at a temperature of about 300° C. by external heating helps to prevent plugging. The top plate 1102 can contain opening 1109 and pipe 1106 opening 1110 for piping any chlorine gas evolved directly to the chlorine header 1010 to prevent recombination of chlorine and lithium and recover the chlorine. The riser can then be operated successfully without an argon pad, although argon padding can be provided if desired through opening 1111. Argon padding is used to prevent nitridation and oxidation of the lithium metal from contact with air. When chlorine is piped directly to the chlorine header 1010 the suction on the header must be carefully controlled so as to prevent metal carryover into the gas line.

The riser effects a complete separation of lithium of high purity, i.e., 99 percent or more. Recombination of lithium and chlorine is virtually eliminated, as well as entrainment of electrolyte. After long service, the riser is exceptionally clean and free from salt or metal accumulation.

Figures 23, 24:
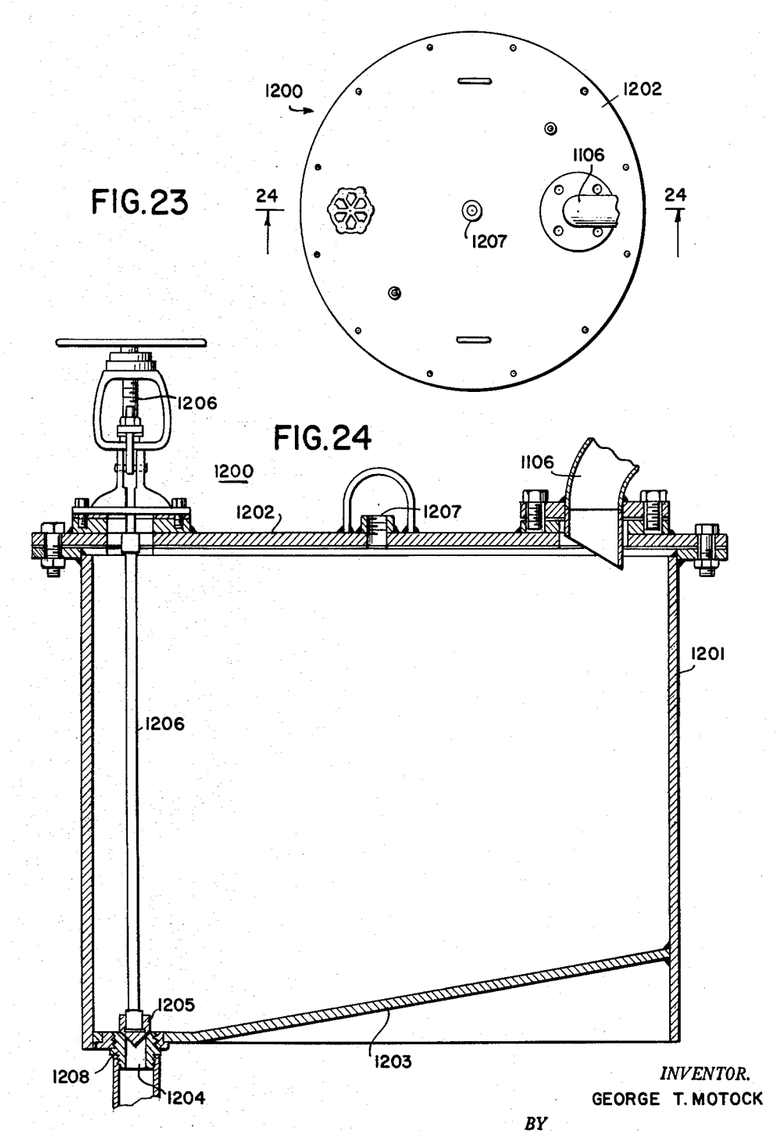
FIGURE 23 is a plan view of the holding tank of FIGURE 1.
FIGURE 24 is a cross-sectional view taken through 24—24 of FIGURE 23.
Figure 25:
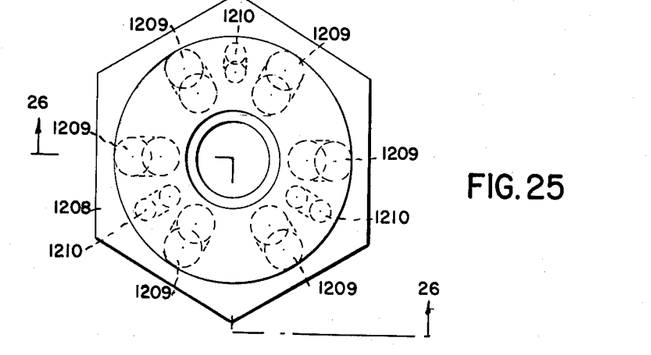
FIGURE 25 is a plan view of the valve seat of the holding tank of FIGURES 23 and 24.
Figure 26:
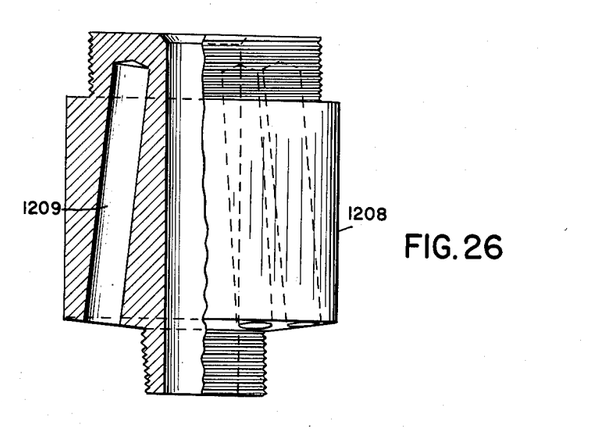
FIGURE 26 is a cross-sectional and front elevation view of the valve seat taken along 26—26 of FIGURE 25.
Figure 27:
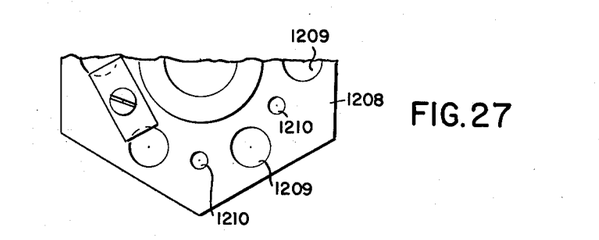
FIGURE 27 is a partial bottom view of the valve seat of FIGURE 25.

The holding tank 1200, as shown in detail in FIGURES 23 and 24, is designed to accumulate and hold lithium metal during a cell campaign. It comprises a cylindrical tank 1201, preferably of stainless steel, with a top plate 1202 having an opening for inflow of lithium metal by pipe 1106 from the riser 1100. The bottom 1203 of the tank is inclined downwardly from the lithium inlet side to an opening 1204 in the opposite side for discharge of lithium metal which is controlled by a valve 1205, controlled by means of stem 1206 from the top of the tank. Opening 1207 is provided for argon padding to prevent nitridation and oxidation of the lithium. The tank is heated by means of external heaters, particularly along the tank bottom, to maintain the molten lithium at temperatures at least about 50° C. higher than the melting point of lithium (186° C.), e.g., about 250° C. The temperature must be maintained evenly over the entire area of the tank or else the lithium metal freezes, particularly in the area around the seat of valve 1205. A jacketed valve seat 1208, as shown in detail in FIGURES 25 to 27, equipped with heaters, e.g., cartridge heaters, effectively prevents such failures from freezing of lithium. The seat 1208 is provided with holes 1209 for receiving the cartridge heaters and between the heaters holes 1210 from thermocouples for controlling the cartridge heaters are provided.

In the operation of the illustrated cell, a mixture of lithium chloride and potassium chloride was charged to the cell to form the melt. The mixture was first subjected to a pre-electrolysis period, preferably with alternating current, to form the molten electrolyte. The pre-electrolysis not only removes water of hydration from the salt but also removes the chemically bound impurities, i.e., metal hydrides and hydroxides which cannot be removed by heating alone. Following this period, the electrolyzing current is applied. The composition of the molten electrolyte was maintained at about 40 to 50 percent lithium chloride. The electrolyte temperature was maintained at about 400 to 480° C., preferably about 420 to 460° C., at a current level of about 20,000 to 30,000 amperes. The temperature can be maintained without the addition of external heat. Operating conditions for optimum production are a current level of 24,000 to 26,000 amperes, an electrolyte composition of 46 to 48 percent lithium chloride, an electrolyte temperature of 450° C. and an electrolyte level of about 2 to 4 inches from the top rim of the cell. Maximum current efficiency is obtained at 25,000 amperes, at which level gives an anode current density of 6.55 and a cathode current density of 5.51 amperes per square inch. Operating at current levels below 24,000 or above 26,000 amperes results in reduction in current efficiency. High melt concentration causes a marked reduction in the cathode to diaphragm potential with excessive formation of surface metal. Deviation from an electrolyte temperature of 450° C. results in reduction in current efficiency. An increased amount of corrosion occurs on the cathode when the melt level falls below 4 inches.

On electrolysis of the fused salt mixture, chlorine was formed at the anode and directed by the diaphragm to the collector assembly and separated from the electrolyte in the refractory-lined chlorine dome. The lithium formed at the cathode on the cathode side of the diaphragm collected in the inverted inclined trough and flowed into the metal riser where it was separated from the electrolyte and flowed to the holding tank, which was periodically drained.

The chlorine from the chlorine dome was of high purity, i.e., above 99.0 percent, and the lithium metal from the hold tank was of a purity of about 99.5 percent, in contrast to prior lithium cells wherein for lack of adequate separating structures chlorine was not recovered and lithium was removed from the bath surface as a crude product containing lithium and potassium chloride impurities.

What is claimed is:

1. In a fused salt electrolysis cell for the production of alkali metal having at least one vertical anode surrounded by an annular cathode and wherein alkali metal is liberated at the cathode and halogen at the anode as products from a fused salt electrolyte, a structure for collecting and separating said products comprising a hood located over and larger than the anode and cathode, a cylinder downwardly projecting from an opening in the hood and having fixedly attached thereto a diaphragm annularly spaced between the anode and cathode, the upper portion of the cylinder opening into a substantially cone-shaped portion on top of the hood and positioned over the cylinder opening and providing an upwardly sloping surface from the cylinder opening to a conduit in the top of the substantially cone-shaped portion, whereby halogen liberated at the anode flows upward in the space between the anode and diaphragm and through the cylinder to the cone and out the cone conduit, the upper surface of the hood being formed by an inclined surface forming an inverted inclined trough encircling the cylinder with an opening in the highest part of the hood surface whereby alkali metal liberated at the cathode flows into the inverted inclined trough and out the trough opening.

2. The structure of claim 1 in which the hood is substantially cylindrical and there are four anodes and cathodes and four cylinders projecting downwardly from the hood, one from each quadrant, and the cone extends down through the inclined surface in its higher portion to form and upwardly sloping surface in the two cylinders located below the higher portion of the inclined surface.

3. In a fused salt electrolysis cell having a vertical anode, a dome for collecting halogen gas liberated at the anode from a fused salt electrolyte, comprising a vertical cylindrical refractory-lined shell positioned over a conduit for halogen gas evolution from a gas collecting structure positioned over the anode, the cylindrical refractory-lined shell having an open bottom and a flat solid top with an opening in the center for escape of halogen gas which is of substantially smaller diameter than the cylindrical shell, and the cylindrical shell having its lower portion surrounding the conduit of the halogen gas collecting structure.

4. In a fused salt electrolysis cell for the production of alkali metal from a fused salt electrolyte, a riser for collecting alkali metal produced comprising a vertical cylinder with a closed top and containing in its lowest portion and adapted to fit over a conduit for alkali metal escape from a collecting structure positioned over a cathode area, a smaller cylinder inside the larger cylinder with a portion of the wall of the smaller interior cylinder being joined to the interior wall of the larger cylinder so as to form a semi-annular space between the smaller and larger cylinders, a conduit extending through the wall of the larger cylinder and upwardly inclined with its lower edge resting on and projecting over the smaller cylinder top, a second conduit downwardly inclined and attached to the first conduit whereby the conduits form an inverted V-shaped structure, whereby alkali metal rises up into the smaller interior cylinder and over its edge into the semi-annular space and then up through the upwardly inclined conduit and then down through the downwardly inclined conduit.

5. The riser of claim 4 in which an opening is provided at the point of joining of the conduits and also removable means for closing the opening.

6. In combination with a fused salt electrolysis cell having at least one vertical anode surrounded by a cylindrical cathode and a cylindrical diaphragm positioned between said anode and cathode, a structure for positioning and supporting a structure for collecting products of electrolysis comprising two vertical electrically insulated posts positioned outside the cell wall, the posts comprising an electrically insulated pilot shaft, a bottom casing surrounding the pilot shaft, screw means in the bottom casing for engaging the pilot shaft to hold and position it laterally, an electrically insulated collar plate resting on the top of the bottom casing, an adjusting collar positioned above the plate, a sleeve surrounding the pilot shaft and resting on the adjusting collar, vertical screw means in the adjusting collar engaging the plate to position the sleeve vertically and a top casing resting on the sleeve, means attached to and joining the top casing of each post from which the structure for collecting products of electrolysis is suspended.

7. In a fused salt electrolysis cell for the production of alkali metal having at least one vertical anode surrounded by an annular cathode and wherein alkali metal is liberated at the cathode and halogen at the anode as products from a fused salt electrolyte, a structure for collecting and separating said products comprising a hood located over and larger than the anode and cathode, a cylinder downwardly projecting from an opening in the hood and having fixedly attached thereto a diaphragm annularly spaced between the anode and cathode, the upper portion of said cylinder opening into a substantially cone-shaped portion on top of the hood and positioned over the cylinder opening and providing an upwardly sloping surface from the cylinder opening to a conduit in the top of the substantially cone-shaped portion, whereby halogen liberated at the anode flows upward in the space between the anode and diaphragm and through the cylinder to the cone and out the cone conduit, the upper surface of the hood being formed by an inclined surface forming an inverted inclined trough encircling the cylinder with conduit in the highest part of the hood surface whereby alkali metal liberated at the cathode flows into the inverted inclined trough and out the trough opening; a dome for collecting halogen gas comprising a vertical cylindrical refractory-lined shell positioned over the cone conduit for halogen gas evolution from the halogen gas collecting structure positioned over the anode, the cylindrical refractory-lined shell having an open bottom and a flat solid top with an opening in the center for escape of halogen gas, the opening being of substantially smaller diameter than the cylindrical shell, and the cylindrical shell having its lower portion surrounding the cone conduit of the halogen gas collecting structure; and a riser for collecting alkali metal produced comprising a vertical cylinder with a closed top and containing in its lowest portion and adapted to fit over the conduit for alkali metal escape from the inverted inclined trough of the collecting structure positioned over the cathode area, a smaller cylinder inside the larger cylinder with a portion of the wall of the smaller interior cylinder being joined to the interior wall of the larger cylinder so as to form a semiannular space between the smaller and larger cylinders, a conduit extending through the wall of the larger cylinder and upwardly inclined with its lower edge resting on and projecting over the smaller cylinder top, a second conduit downwardly inclined and attached to the first conduit whereby an inverted V-shaped structure is formed, whereby alkali metal rises up into the smaller interior cylinder and over its edge into the semi-annular space and then up through the upwardly inclined conduit and then down through the downwardly inclined conduit.

8. The structure of claim 1 in which the upper end of the diaphragm is fixedly attached to a ring, the ring having a portion of reduced diameter which is fixedly attached to the cylinder.

9. The structure of claim 2 in which the upper end of the diaphragm is fixedly attached to a ring, the ring having a portion of reduced diameter which is fixedly attached to the cylinder.

References Cited in the file of this patent

UNITED STATES PATENTS

| | | |
|---|---|---|
| 1,924,151 | Burgess | Aug. 29, 1933 |
| 2,130,801 | Hulse | Sept. 20, 1938 |
| 2,893,940 | Smith | July 7, 1959 |
| 2,919,238 | Bergh | Dec. 29, 1959 |
| 2,924,558 | Gallinger | Feb. 9, 1960 |
| 2,940,918 | Mueller et al. | June 14, 1960 |
| 2,944,955 | Fentress | July 12, 1960 |

FOREIGN PATENTS

| | | |
|---|---|---|
| 565,732 | Canada | Nov. 4, 1958 |